Patented Nov. 8, 1938

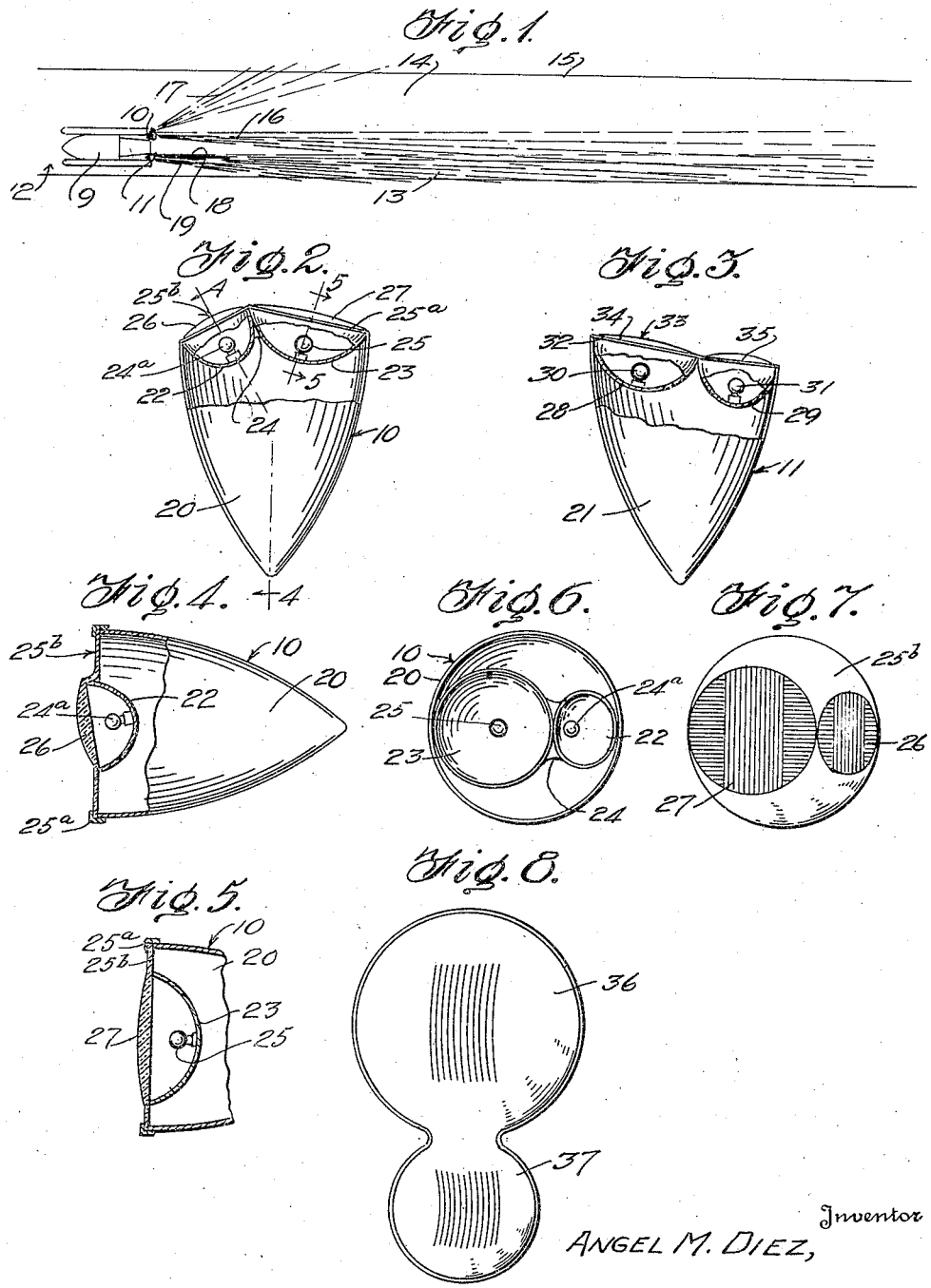

2,136,285

UNITED STATES PATENT OFFICE 2,136,285

HEADLIGHT

Angel M. Diez, Mexico, D. F., Mexico

Application January 27, 1938, Serial No. 187,301
In Mexico December 15, 1937

2 Claims. (Cl. 240—7.1)

This invention relates to a pair of headlights for use in connection with an automotive vehicle, and has for its object to provide, in a manner as hereinafter set forth, the headlights with means for completely and efficiently illuminating the right side and the left edge of the road on which the vehicle is travelling to provide a dark field of travel for an oncoming vehicle and at the same time avoiding any glare from light beams on the driver of the oncoming vehicle whereby collisions and accidents due to glaring lights are reduced to a minimum.

A further object of the invention is to provide, in a manner as hereinafter set forth, a pair of headlights with means for completely and efficiently illuminating the right side of the road on which a vehicle is travelling forwardly and with one of the headlights provided with means for illuminating the left edge of the road and at the same time avoiding glare on the driver of an oncoming vehicle without the necessity of a driver controlling the headlights to diminish the lights' intensity, thus avoiding accidents caused by glaring lights and negligence or carelessness of a driver to avoid this glare.

A further object of the invention is to provide, in a manner as hereinafter set forth, a pair of headlights, each including a pair of inclined reflectors carrying light sources, an inclined lens at the mouth of and having its inclination corresponding to the inclination of a reflector, the reflectors and lenses of one headlight and one of the reflectors and one of the lenses of the other of said lights providing for completely and efficiently illuminating the right side of the road on which the vehicle is travelling, and the other one of the reflectors and the other one of the lenses of the other of the headlights efficiently illuminating the left side of the road to make visible the left edge of the latter simultaneously with the illumination of the right side of the road to avoid a glaring effect on a driver, whereby the illuminations referred to will materially assist in reducing the possibilities of accidents and collisions to the minimum and act as a safeguard for the drivers of vehicles approaching each other.

A further object of the invention is to provide, in a manner as hereinafter set forth, a pair of headlights, each including a transparent element formed with inclined lenses for positioning at the mouths of a pair of inclined reflectors, one having a greater diameter of mouth than the other, each lens corresponding in diameter to the mouth of the reflector with which it is associated and arranging the reflectors of each pair in fixed relation with respect to a headlight casing in which the pair of reflectors is arranged.

A further object of the invention is to provide, in a manner as hereinafter set forth, a pair of headlights, each including lenses disposed at inclinations and reflectors associated with and disposed at the same inclination as the lenses for projecting main and auxiliary light beams for the purpose referred to.

Embodying the foregoing stated objects and others which may hereinafter appear, the invention consists of the novel construction, combination and arrangement of parts as will be more specifically referred to, and illustrated in the accompanying drawing wherein are shown embodiments of the invention, but it is to be understood that changes, variations and modifications may be resorted to which fall within the scope of the invention as claimed.

In the drawing wherein like reference characters denote corresponding parts throughout the several views:

Figure 1 is a diagrammatical view illustrating the manner in which the light beams are projected upon a road by a pair of headlights in accordance with this invention, Figure 2 is a top plan view, broken away, and partly in section of the left headlight of the pair of headlights, Figure 3 is a view similar to Figure 2 of the right headlight of the pair of headlights, Figure 4 is a section on line 4—4, Figure 2, Figure 5 is a section on line 5—5, Figure 2, Figure 6 is a front elevation of the left headlight with the lenses removed, Figure 7 is a front elevation of the lenses and their carrier employed in connection with the left headlight, and Figure 8 is a front elevation of a modified form of headlight.

With reference to Figure 1, the simulation of an automotive vehicle is designated at 9, its left and its right headlight at 10, 11 respectively, the simulation of a road, on which the vehicle travels at 12, the right side of the road 12 at 13, the left side of the road 12 at 14, the left edge of the road 12 at 15, the main beam from headlight 10 at 16, the auxiliary beam from headlight 10 at 17, the main beam from headlight 11 at 18 and the auxiliary beam from headlight 11 at 19.

As shown the headlights 10, 11 include open front casings 20, 21 of any suitable contour preferably of semi-elliptical contour and are so shown. The front edge of casing 20 is formed of an outer and an inner portion upon two different inclinations. The said outer portion extends forwardly throughout at an inclination from the outer side and the said inner portion extends forwardly throughout from the inner side of the casing 20 and merges into the said outer portion. The inner portion is of greater length than said outer portion. The front edge of casing 21 is formed of an outer and an inner portion. The outer portion of the front edge of casing 21 extends inwardly at a slight rearward inclination throughout from the outer side of casing 21. The inner portion of the front edge of casing 21 extends inwardly at a slight rearward inclination from the inner side of casing 21 and merges into the outer edge portion of the latter. The casing 21 has the inner portion of its front edge of greater length than the outer portion of such edge. The inclinations of the said inner portions of the casings are substantially the same. The inclination of the said outer portion of casing 20 is greater than the inclination of the said outer portion of casing 21.

Arranged within the front portion of casing 20 is a pair of inclined reflectors 22, 23 of parabola contour. The front end of reflector 22 is of less diameter than the front end of reflector 23. The front portions of the inner sides of the reflectors 22, 23 are held in fixed abutting relation by a coupling means 24 integral therewith. The front portions of the outer sides of the reflectors 22, 23 are fixed to the inner face of casing 20 in any suitable manner, preferably, by welding. The fixedly securing of the reflectors 22, 23 together and to the casing 20 permanently maintains them at the inclination to which they have been set. The inclination of the reflector 22 corresponds to the inclination of the outer portion of the front edge of casing 20. The diameters of the front ends of the reflectors 22, 23 correspond substantially respectively to half of the length of the outer and inner portions of the front edge of casing 20. Arranged within the reflectors 22, 23, at the axes thereof are light sources 24ª, 25 respectively, in the form of electric lamps. The lamp 24ª is disposed at an outward inclination and such inclination corresponds to the inclination of the reflector 22 which is rearwardly from its inner to its outer side. The lamp 25 is disposed at an inward inclination and such inclination corresponds to the inclination of the reflector 23 which is rearwardly from its inner to its outer side. The reflector 22 inclines downwardly from rear to front thereof with respect to the axis of the casing 20.

Secured against the front edge of casing 20 by a flanged ring 25ª is a transparent element 25ᵇ formed of vitreous material having as integral parts thereof a pair of lenses 26, 27. The lens 26 abuts the front edge of and is disposed at inclinations corresponding to the inclinations of the reflector 22. The lens 27 abuts the front edge of and is disposed at the same inclination as the reflector 25. The lenses 26, 27 merge into each other centrally of their inner sides.

Arranged within the front portion of the casing 21 is a pair of inclined reflectors 28, 29 of parabola contour which are fixedly secured together at their inner sides in the same manner as the reflectors 22, 23. The reflector 28 at its outer end is of greater diameter than the reflector 29. The reflectors 28, 29 are fixedly secured to the inner face of the casing 21 in the same manner as the reflectors 22, 23 are secured to the casing 20. The fixedly securing of the reflectors 28, 29 together and to the casing 21 permanently maintains them at the inclination to which they have been set. The inclination of the reflector 28 corresponds to the inclination of the inner portion of the front edge of casing 21. The inclination of the reflector 29 corresponds to the inclination of the outer portion of the front edge of casing 21. The diameters of the front ends of the reflectors 28, 29 correspond substantially respectively to half of the length of the inner and outer portions of the front edge of casing 21. Arranged within the reflectors 28, 29, at the axes thereof are light sources 30, 31 respectively in the form of electric lamps. The lamp 30 is disposed at a slight inclination toward one side of the axis of casing 21. The lamp 31 extends at a slight inclination towards the other side of the axis of casing 21. The inclination of the lamps 30, 31 correspond to the inclination of the reflectors 28, 29 respectively.

Secured against the front edge of casing 21, by a flanged ring 32 is a transparent element 33 formed of vitreous material having as integral parts thereof a pair of lenses 34, 35. The lens 34 abuts the front edge of and is disposed at the same inclination as the reflector 28. The lens 35 abuts the front edge of and is disposed at the same inclination as the reflector 29.

The fronts of the reflectors 22, 23 are disposed substantially in transverse relation with respect to the casing 20. The fronts of the reflectors 28, 29 are disposed substantially in transverse relation with respect to the casing 21.

The reflector 22, lamp 24ª and lens 26 constitute a unit for reflecting and projecting an auxiliary light beam. The reflector 23, lamp 25 and lens 27 constitute a unit for reflecting and projecting a main light beam. The reflector 28, lamp 30 and lens 34 constitute a unit for reflecting and projecting a main light beam and the reflector 29, lamp 31 and lens 35 constitute a unit for reflecting and projecting an auxiliary light beam. The units of which the reflectors 23, 28 form elements thereof are for projecting beams of greater candle power and light intensity than the other units.

With reference to Figure 8, the modified form consists in the superimposing of the large unit 36 for reflecting and projecting a main light beam upon the small unit 37 for reflecting and projecting an auxiliary light beam.

The manner in which the light beams are reflected and projected by the headlights to completely illuminate the right side and the left edge of the road is illustrated by the diagrammatic showing, Figure 1.

What I claim is:

1. In a headlight for automotive vehicles, an open front casing, a transparent closure element of disc-like form for and disposed completely forwardly of said open front, said element having as inherent parts thereof forming an inner and outer circular lens disposed at opposite inclinations and arranged at the front of the casing, said inner lens being of greater area than the outer lens, a pair of oppositely inclined reflectors of parabola form within the casing, each reflector for correlation with a lens and having the diameter at its outer end substantially the same as the diameter of the lens with which it is correlated, said reflectors disposed in juxtaposition to the inner face of said element, a light source carried by each reflector, the light source carried by that reflector correlated with the lens of greatest area being constructed to provide a light beam of greater candlepower and intensity than the light provided by the other of said light sources, each lens, its correlated reflector and the light source carried by the latter providing an independent light beam reflecting and projecting unit, said units being disposed in oppositely extending inclined planes directed through the open front of the casing, the unit including the lens of greater area directed to the right and the plane of the other of said units to the left.

2. In a headlight for automotive vehicles, an open front casing, a transparent closure element of disc-like form for and disposed completely forwardly of said open front, said element having as inherent parts thereof forming an inner and outer circular lens disposed at opposite inclinations and arranged at the front of the casing, said inner lens being of greater area than the outer lens, a pair of oppositely inclined reflectors of parabola form within the casing, each reflector for correlation with a lens and having the diameter at its outer end substantially the same as the diameter of the lens with which it is correlated, said reflectors disposed in juxtaposition to the inner face of said element, a light source carried by each reflector, the light source carried by that reflector correlated with the lens of greatest area being constructed to provide a light beam of greater candlepower and intensity than the light provided by the other of said light sources, each lens, its correlated reflector and the light source carried by the latter providing an independent light beam reflecting and projecting unit, said units being disposed in oppositely extending inclined planes directed through the open front of the casing, the unit including the lens of greater area directed to the right and the plane of the other of said units to the left, that unit directed in the inclined plane to the left being downwardly inclined from rear to front.

ANGEL M. DIEZ.